United States Patent
Kim

(10) Patent No.: US 8,926,723 B2
(45) Date of Patent: Jan. 6, 2015

(54) DUST COLLECTING APPARATUS HAVING A DUST REMOVING UNIT

(75) Inventor: Tak-Soo Kim, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 233 days.

(21) Appl. No.: 13/512,868

(22) PCT Filed: Apr. 21, 2010

(86) PCT No.: PCT/KR2010/002487
§ 371 (c)(1),
(2), (4) Date: May 30, 2012

(87) PCT Pub. No.: WO2011/065638
PCT Pub. Date: Jun. 3, 2011

(65) Prior Publication Data
US 2012/0233971 A1    Sep. 20, 2012

(30) Foreign Application Priority Data

Nov. 30, 2009    (KR) .......................... 10-2009-0116958

(51) Int. Cl.
| | | |
|---|---|---|
| B01D 50/00 | (2006.01) | |
| B04C 5/10 | (2006.01) | |
| A47L 9/10 | (2006.01) | |
| A47L 9/16 | (2006.01) | |
| B04C 5/187 | (2006.01) | |
| B04C 5/26 | (2006.01) | |
| B01D 46/00 | (2006.01) | |
| B04C 9/00 | (2006.01) | |

(52) U.S. Cl.
CPC . B04C 5/10 (2013.01); A47L 9/106 (2013.01); A47L 9/1625 (2013.01); A47L 9/1666 (2013.01); B04C 5/187 (2013.01); B04C 5/26 (2013.01); B01D 46/0075 (2013.01); B04C 2009/004 (2013.01)

USPC .................. 55/289; 55/301; 55/304; 55/337; 96/57

(58) Field of Classification Search
CPC ............ B01D 46/75; B04C 5/10; B04C 5/26; B04C 5/187; A47L 9/106; A47L 9/1666; A47L 9/1625
USPC .......................... 55/289, 301, 304, 337; 96/57
See application file for complete search history.

(56) References Cited

U.S. PATENT DOCUMENTS

| | | |
|---|---|---|
| 6,746,500 B1 | 6/2004 | Park et al. |
| 7,794,545 B2 | 9/2010 | Yotsuya et al. |
| 2008/0190080 A1 | 8/2008 | Oh et al. |
| 2010/0242221 A1* | 9/2010 | Horne et al. ..................... 15/347 |
| 2011/0011041 A1* | 1/2011 | Bae et al. ......................... 55/289 |

FOREIGN PATENT DOCUMENTS

| | | |
|---|---|---|
| JP | 2007-252838 | 10/2007 |
| JP | 2009-056029 | 3/2009 |

(Continued)

OTHER PUBLICATIONS

International Search Report for PCT/KR2010/002487;mailed Jan. 10, 2011.

Primary Examiner — Jason M Greene
Assistant Examiner — Karla Hawkins
(74) Attorney, Agent, or Firm — Staas & Halsey LLP

(57) ABSTRACT

A dust collecting apparatus having a dust removing unit. The dust collecting apparatus includes a first cyclone unit which rotates air introduced from outside to separate dust from the air; a second cyclone unit including a second centrifugal separation chamber into which dust discharged from the first cyclone unit is introduced, and second cyclone discharge pipe for passage of air discharged from the second centrifugal separation chamber; a filter assembly including a filter member arranged in the upper portion of the second cyclone unit to separate fine dust from air discharged from the second cyclone unit; and a dust removing unit which separates dust from the filter member, wherein the dust separated from the filter member passes through the second cyclone discharge pipe and is collected in the second centrifugal separation chamber.

20 Claims, 10 Drawing Sheets

(56) References Cited

FOREIGN PATENT DOCUMENTS

| KR | 10-2001-0083627 | A1 | 9/2001 |
|----|-----------------|----|--------|
| KR | 10-2006-0034894 | A1 | 4/2006 |
| KR | 10-0776403 | B1 | 11/2007 |
| KR | 10-2008-0017166 | A1 | 2/2008 |

* cited by examiner

DUST COLLECTING APPARATUS HAVING A DUST REMOVING UNIT

CROSS-REFERENCE TO RELATED APPLICATIONS

This application is a national phase application, under 35 U.S.C. 371, of International Application No. PCT/KR2010/02487, filed Apr. 21, 2010, which claimed priority to Korean Application No. 10-2009-0116958, filed Nov. 30, 2009, the disclosures of both of which are incorporated herein by reference.

BACKGROUND

1. Field

Example embodiments of the following disclosure relate to a dust collecting apparatus, which is mounted to a vacuum cleaner to collect dust, and more particularly to, a dust collecting apparatus having a dust-removing unit.

2. Description of the Related Art

In general, the dust collecting apparatus is installed to a main body of a vacuum cleaner to separate dust by introducing outside air. Such a dust collecting apparatus includes a centrifugal separator (cyclone) for centrifugally separating introduced dust, a dust case for collecting the separated dust, and a filter member for secondarily filtering fine dust included in the dust-separated air so as to reduce inconvenience of exchanging a dust bag and cost burden.

According to such a dust collecting apparatus, when the fine dust is accumulated in the filter member, due to a decline of suction force, dust suction against surface to be cleaned and centrifugal separation in the centrifugal separator are not smooth. As a result, users are inconvenienced by having to periodically separate the filter member from the dust collecting apparatus to clean away the accumulated dust from the filter member when a decline in suction force is noticed.

To reduce such inconvenience of maintenance, Korean Patent Publication No. 10-2008-0104516 and Japanese Patent Publication No. 2008-036170 disclose a dust collecting apparatus including a filter member provided with a dust-removing unit. Since the dust-removing unit applies impact to the filter member to separate the accumulated dust in the filter member from the filter member, it is not necessary to separate the filter member from the dust collecting apparatus to clean up the filter member, and it is possible to conveniently separate the accumulated dust from the filter member.

However, since the dust collecting apparatus disclosed in the Korean Patent Publication No. 10-2008-0104516 includes a special dust collecting chamber in addition to a dust collecting chamber in which dust separated from the filter member is stored from a centrifugal separator, there is a problem of enlarging a volume of the dust collecting apparatus due to installation of the special dust collecting chamber.

In addition, the dust collecting apparatus disclosed in the Japanese Patent Publication No. 2008-036170 includes a special bypass to collect the dust separated from the filter member. Accordingly, when operating the vacuum cleaner, the dust separated from the filter member is fed to a centrifugal separator by air introduced through the bypass. Since an opening/closing lid, a shutter for opening/closing, a limit switch, and the like are installed at the bypass, there is a problem that the structure of the dust collecting apparatus becomes complicated.

In addition, in the dust collecting apparatus, since fine dust is filtered by a filter member while passing through the filter member after dust from the outside air, only once performing dust separation through a centrifugal separator, a large amount of the dust is accumulated in the filter member. Accordingly, the users often have to operate the dust-removing unit, thereby shortening the filter member's lifespan.

SUMMARY

Example embodiments of the following disclosure solve the above problems and an object of the present disclosure is to provide a dust collecting apparatus having a simple and compact dust-removing unit.

Another object of the present disclosure is to a provide a dust collecting apparatus having a dust-removing unit, which can lengthen operation period of the dust removing unit by reducing the amount of the dust accumulated in the filter member.

To achieve the above-described object, a dust collecting apparatus of the disclosure includes: a first cyclone unit, which rotates air introduced from an outside to separate dust contained in the air; a second cyclone unit including a second centrifugal separation chamber into which air discharged form the first cyclone unit is introduced, a second cyclone discharge pipe through which the air discharged from the second centrifugal separation chamber passes; a filter assembly arranged in an upper portion of the second cyclone unit and including a filter member which separates fine dust from the air discharged from the second cyclone unit; and a dust-removing unit separating dust attached in the filter member, wherein the dust separated from the filter member is collected to the second centrifugal separation chamber through the second cyclone discharge pipe.

The first cyclone unit may be configured to surround the second cyclone unit and the filter assembly.

The first cyclone unit may include a first cyclone case of which an upper portion is opened and formed at an upper side with an introducing pipe; and an internal case installed in the first cyclone case and having a plurality of through holes.

The internal case may have at lease one re-scattering rib extending from an external circumferential surface thereof.

The second cyclone unit may include: a second cyclone case installed in the internal case; a centrifugal separation pipe installed at a center in the second cyclone case to form the second centrifugal separation chamber; and a guiding member to communicate an outside of the second cyclone case with an inside of the centrifugal separation pipe and to introduce air introduced between the internal case and the second cyclone case to the inside of the centrifugal separation pipe to form a whirling current.

The plurality of through holes may be formed at an upper portion of the internal case; wherein the guide member may be formed at a lower portion of the centrifugal separation pipe and the second cyclone case.

The second cyclone discharge pipe may be formed in a funnel shape and may include an inclined portion formed in a wide upper end and narrow lower end shape and configured to support the filter assembly; and a cylindrical portion coupled to the inclined portion such that at least a portion of dust separated from the filter assembly by the dust-removing unit drops onto the inclined portion and then slips along the inclined portion to drop in the second centrifugal separation chamber through the cylindrical portion.

The second cyclone unit may further include a skirt downwardly extended from the inclined portion.

The filter assembly may include: a filter frame formed with a plurality of slits; a filter member inserted into the plurality of slits; and a filter fixing cover coupled to an upper surface of the filter frame. The dust-removing unit may include: a rotational support portion, which passes through the filter fixing cover in a rotating manner; a dust-removing plate formed at a side of the rotational support portion to apply impact to the filter member; and an operating lever formed at another side of the rotational support portion.

The filter member may have a cylindrical shape such that air including fine dust is filtered, outwardly flowing from an inside of the filter member. The filter member may have a circular plate shape such that air including fine dust is filtered, upwardly flowing from a portion below of the filter member.

The apparatus may further include a cover member to cover the first cyclone unit and the second cyclone unit.

The apparatus may further include a rising inducement member provided in the second cyclone unit such that the whirling current formed by introducing to the second cyclone unit moves up. According to this, a rising effect of the whirling current in the second cyclone unit is improved.

The apparatus may further include a dust collecting extension member extending towards a lower sides of the first and second cyclone units.

The dust-removing unit may include: a rotational support portion installed to the filter assembly in a rotating manner; a dust-removing plate formed at the rotational support portion to apply impact to the filter assembly; an operating lever installed at a top end of the rotational support portion; and a brush portion installed at the rotational support portion to brush away dust dropped on an inclined upper surface of the second cyclone discharge pipe.

The brush portion may include: at least one brush body; and a brush member provided in the brush body to come in contact with the second cyclone discharge pipe.

To achieve the above-described object a dust collecting apparatus, includes: a first cyclone unit that rotates air introduced from an outside; a first centrifugal separation chamber to separate dust contained in the introduced air; a second centrifugal separation chamber to secondarily separate dust from the introduced air, and a second cyclone discharge chamber to discharge the introduced air; a filter assembly of a circular plate shape, including a filter member that is horizontally arranged at an upper portion of the second cyclone discharge pipe to re-filter the introduced air discharged from the second cyclone discharge chamber.

Additional aspects and/or advantages will be set forth in part in the description which follows and, in part, will be apparent from the description, or may be learned by practice of the invention.

According to the present disclosure, since the dust separated from the filter member flows backward into the second cyclone unit through the second cyclone discharge pipe, it is not necessary to provide a special dust passage, and thereby it is possible to simplify the structure of the dust collecting apparatus.

In addition, since the dust separated from the filter member by a dust-removing operation is collected into the second dust collecting chamber of the second cyclone unit, it is not necessary to a special dust collecting chamber, and thereby it is possible that a volume of the dust collecting apparatus is compact.

Further, since the air introduced into the dust collecting apparatus is centrifugally separated two times through the first cyclone unit and the second cyclone unit and then fine dust is filtered by the filter member, the performing period of the removing-dust operation of the filter member is lengthened, thereby extending the filter member's life span.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
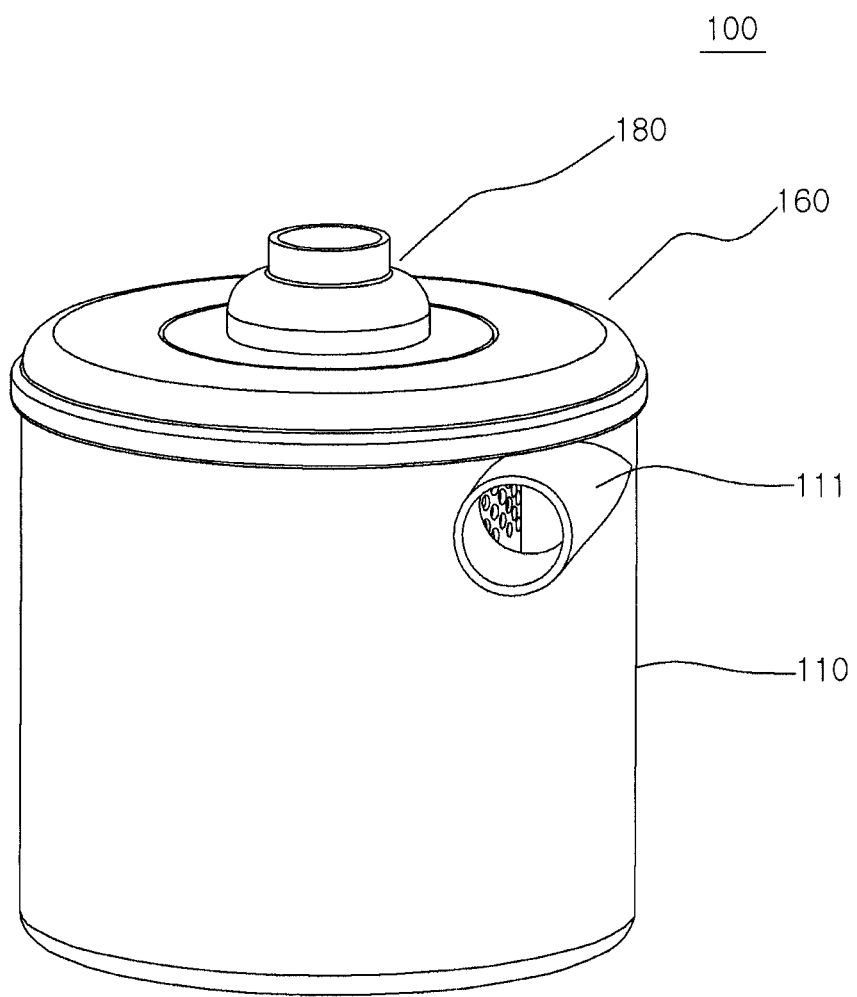
FIG. 1 is a perspective view illustrating a dust collecting apparatus, according to an exemplary embodiment of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

Hereinafter, a dust collecting apparatus 100 having a dust-removing unit according to a first exemplary embodiment of the present disclosure will be described in detail with reference to the accompanying drawings.

Figure 2:
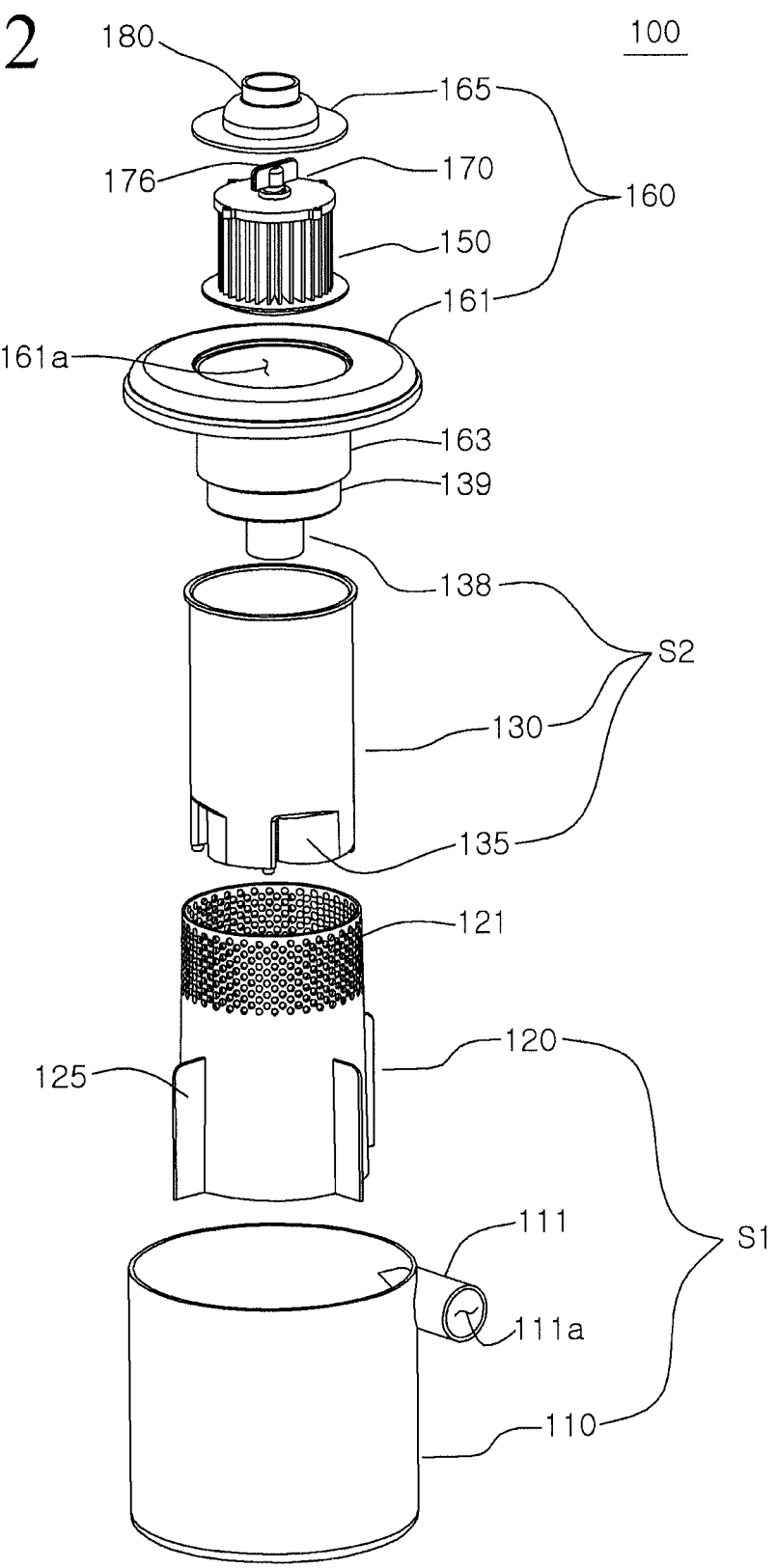
FIG. 2 is an exploded perspective view illustrating a dust collecting apparatus, according to an exemplary embodiment of the present disclosure.
Figure 3:
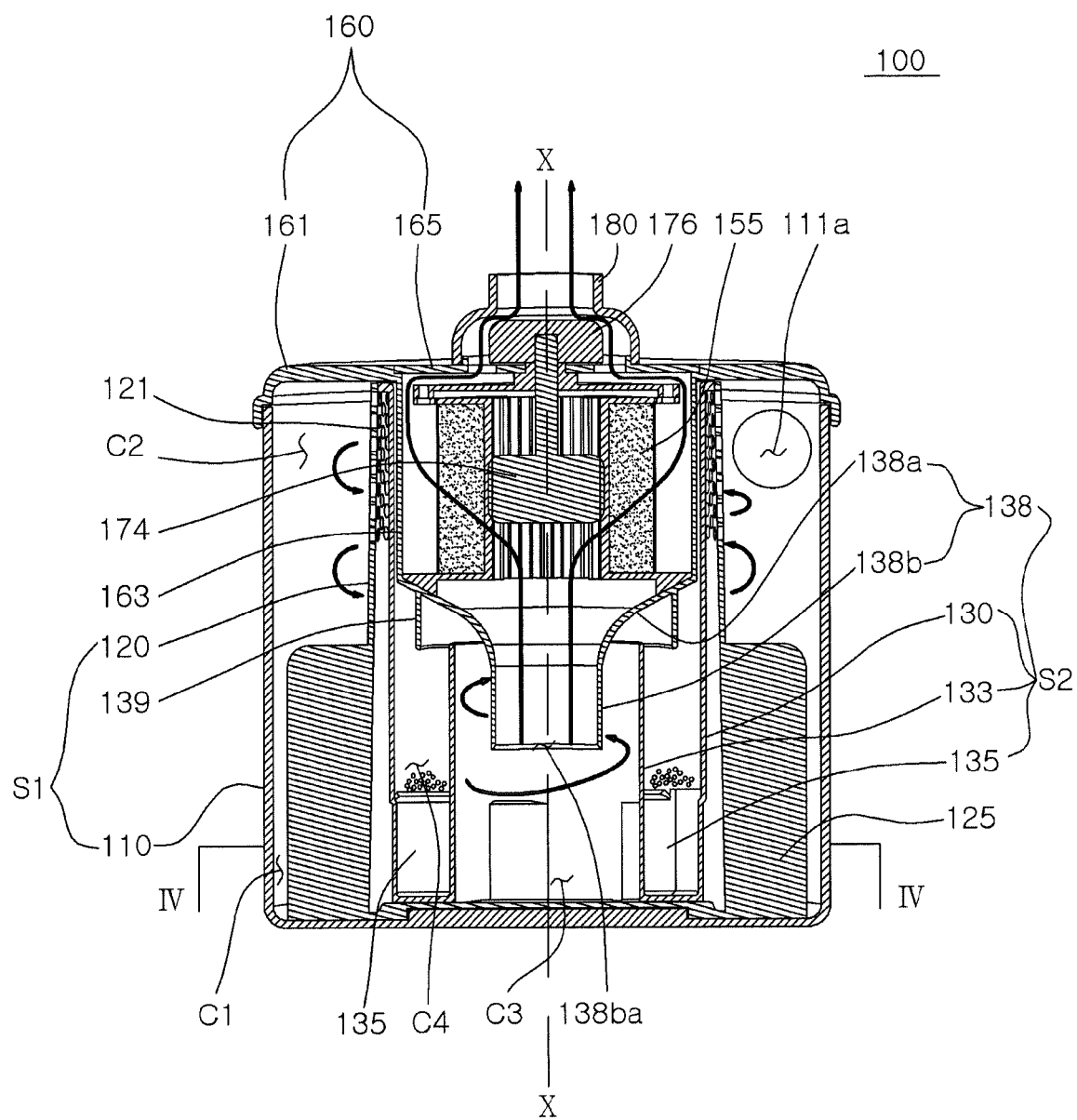
FIG. 3 is a cross-sectional view illustrating a dust collecting apparatus, according to an exemplary embodiment of the present disclosure.

FIG. 1 is a perspective view illustrating the dust collecting apparatus 100, according to an exemplary embodiment of the present disclosure. FIG. 2 is an exploded perspective view illustrating the dust collecting apparatus 100, according to an exemplary embodiment of the present disclosure. FIG. 3 is a cross-sectional view illustrating the dust collecting apparatus 100, according to an exemplary embodiment of the present disclosure.

Referring to FIGS. 1 to 3, the dust-collecting apparatus 100, according to an exemplary embodiment of the present disclosure includes a first cyclone unit S1, a second cyclone unit S2, a cover member 160, a filter assembly 150 and a dust-removing unit 170.

The first cyclone unit S1 includes a first cyclone case 110 and an internal case 120.

The first cyclone case 110 is a cylindrical shape of which an upper portion is opened. An introducing pipe 111 is coupled to a side of an upper portion of the first cyclone case 110 in a tangential direction of a circumferential surface of the first cyclone 110. The introducing pipe 111 has an introducing opening 111a. Outside air introduced through the introducing pipe 111 into the first cyclone case 110 forms a whirling current.

The internal case 120 has a diameter smaller than that of the first cyclone case 110, a cylindrical shape of which an upper portion is opened. The internal case 120 is arranged in the first cyclone case 110, and a center of the internal case 120 and a center of first cyclone case 110 are concentric. A plurality of through holes 121 is formed in an upper circumferential surface of the internal case 120 and at least one anti-scattering rib 125 is outwardly formed on an external circumferential surface of a lower portion of the internal case 120. Four anti-scattering ribs 125 are formed in a plate shape on the external circumferential surface, which are spaced apart at a same distance (see FIG. 4). A lower portion of a space between the internal case 120 and the first cyclone case 110 is a first dust collecting chamber C1, and an upper portion of the space between the internal case 120 and the first cyclone case 110 is a first centrifugal separation chamber C2.

The second cyclone unit S2 may operate to secondarily separate fine dust from the air discharged after separating relatively large sized dust through the first cyclone unit S1, and includes a second cyclone case 130, a centrifugal separation pipe 133, a guiding member 135 and a second cyclone discharging pipe 138.

The second cyclone case 130 is spaced from the internal case 120 at a distance and has a cylindrical shape of which an upper portion is opened, and is installed at a center in the internal case 120. The centrifugal separation pipe 133 has a cylindrical shape of which an upper portion is opened, is installed at a center in the second cyclone case 130, and is upwardly extended to have a height from a lower surface of the second cyclone case 130. An internal space of the centrifugal separation pipe 133 becomes a second centrifugal separation chamber C3, a space between the centrifugal separation pipe 133 and the second cyclone case 130 becomes a second dust collecting chamber C4 into which dust separated through the second centrifugal chamber C3 is collected. The second dust-collecting chamber C4 is formed to surround the second centrifugal separation chamber C3.

The guiding member 135 is formed at the lower portion of the second cyclone case 130.

Figure 4:
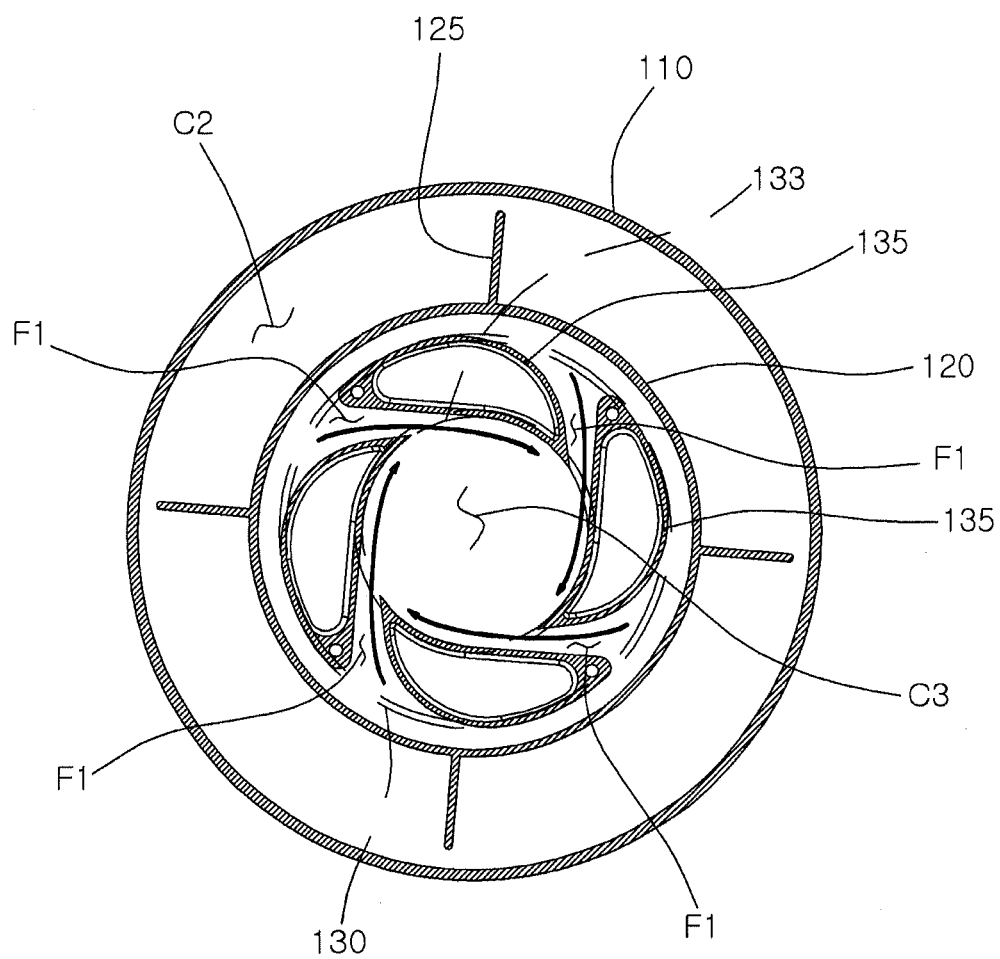
FIG. 4 is a cross-sectional view taken along line IV-IV of FIG. 3.

FIG. 4 is a cross-sectional view taken along the line IV-IV of FIG. 3. Referring to FIG. 4, the guiding members 135 are made up of four members, which are integrally formed with the second cyclone case 130. Passages F1 are formed between the guiding members 135 to communicate a space between the second cyclone case 130 and the internal case 120 with the internal space of the centrifugal separation pipe 133. In this case, the passages F1 are formed in a tangential direction of the second centrifugal chamber C3, and air introduced into the second centrifugal separation chamber C3 through the passages F1 makes a whirling current.

Referring to FIGS. 2 and 3, a second cyclone discharge pipe 138 is to discharge the air from which dust is separated through the centrifugal separation pipe 133, from the second cyclone unit S2. The second cyclone discharge pipe 138 is extended toward a lower portion of a filter receiving portion 163 installed at a lower portion of a cover member 160 and is integrally formed with the cove member 160. The second cyclone discharge pipe 138 is formed in a funnel shape and includes an inclined portion 138a and a cylindrical portion 138b.

Referring to FIG. 3, one side of the inclined portion 138a is integrally formed with a lower end of the filter receiving portion 163, and has a shape in which an upper end thereof is wide and a lower end thereof is narrow (wide upper end and narrow lower end shape). A cylindrical skirt 139 is downwardly extended from a lower surface of the inclined portion 138a. The cylindrical portion 138b is integrally formed with the lower end of the inclined portion 138a, a discharging opening 138ba through which air purified through the second centrifugal separation chamber C3 is discharged is formed at the lower end of the cylindrical portion 138b. The cylindrical portion 138b is installed to be inserted into the centrifugal separation pipe 133. In this case, the lower end of the skirt 139 and the upper end of the centrifugal separation pipe 133 are located on the same plane. In addition, it is configured, such that a diameter of the centrifugal separation pipe 133 is larger than that of the cylindrical portion 138b and is smaller than that of the skirt 139. Preferably, the diameter of the centrifugal separation pipe 133 is half of the sum of diameters of the cylindrical portion 138b and the skirt 139.

Referring to FIGS. 2 and 3, the cover member 160 is coupled to the opened upper portion of the first cyclone case 110 to cover the upper portion of the first cyclone unit S1 and the second cyclone unit S2 and includes a first cover portion 161 and second cover portion 165.

The first cover portion 161 is formed in a circular plate having a hollow portion 161a perforated in the central portion thereof to cover the first centrifugal separation chamber C2. The filter-receiving portion 163 which can receive a filter assembly 150 is downwardly integrally extended from a portion around the hollow portion 161a in first cover portion 161.

Figure 5:
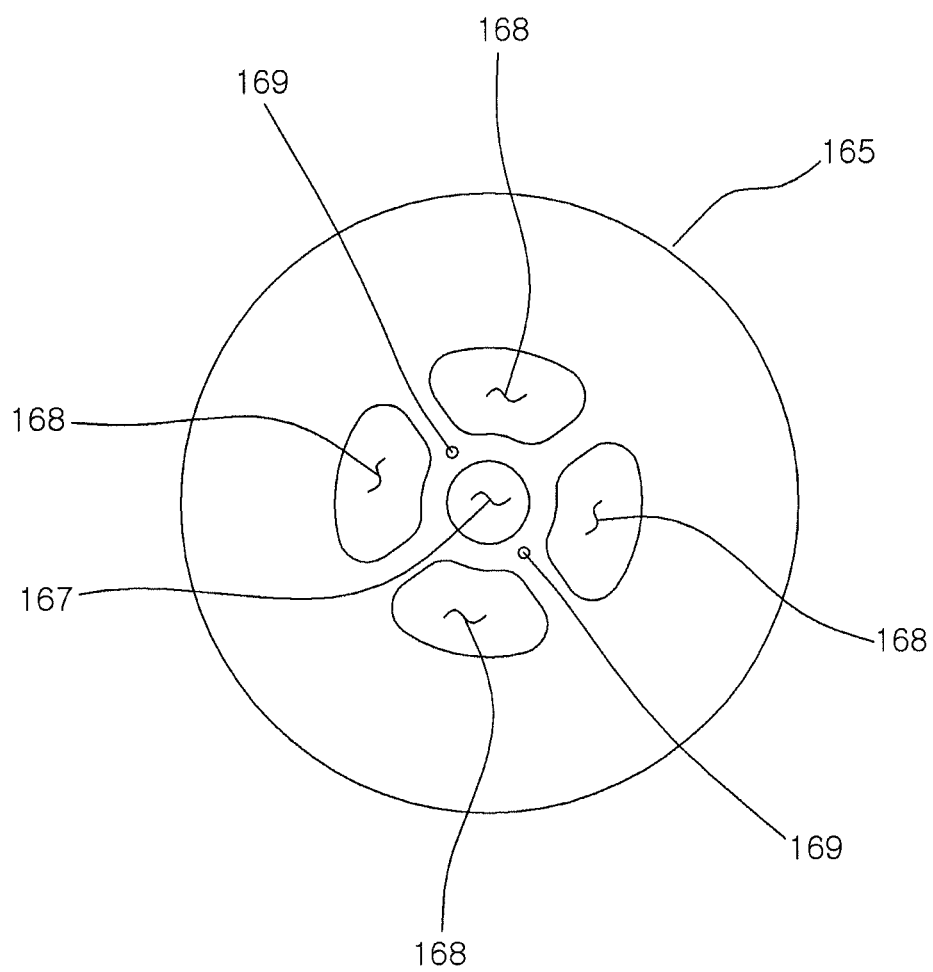
FIG. 5 is a bottom view illustrating a second cover portion.

The second cover portion 165 is detachably coupled to the hollow portion 161a, and is formed in a circular plate to cover the opened filter-receiving portion 163. FIG. 5 is a bottom view illustrating the bottom surface of the second cover portion 165. As shown in FIG. 5, a first insertion hole 167 may be formed in a perforated manner at the center of the second cover portion 165, four air discharge holes 168 are formed to surround the first insertion hole 167, which are spaced at a distance, and a second insertion holes 169 are formed between the first insertion hole 167 and the air discharge holes 168. An air discharge pipe 180 through which purified air is discharged to the outside of the dust collecting apparatus 100 is installed at the upper surface of the second cover portion 165 (see FIGS. 2 and 3).

Referring FIG. 3, the filer assembly 150 is mounted to the filter receiving portion 163 so as to re-filter fine dust from the air discharged from the second cyclone unit S1.

Figure 6:
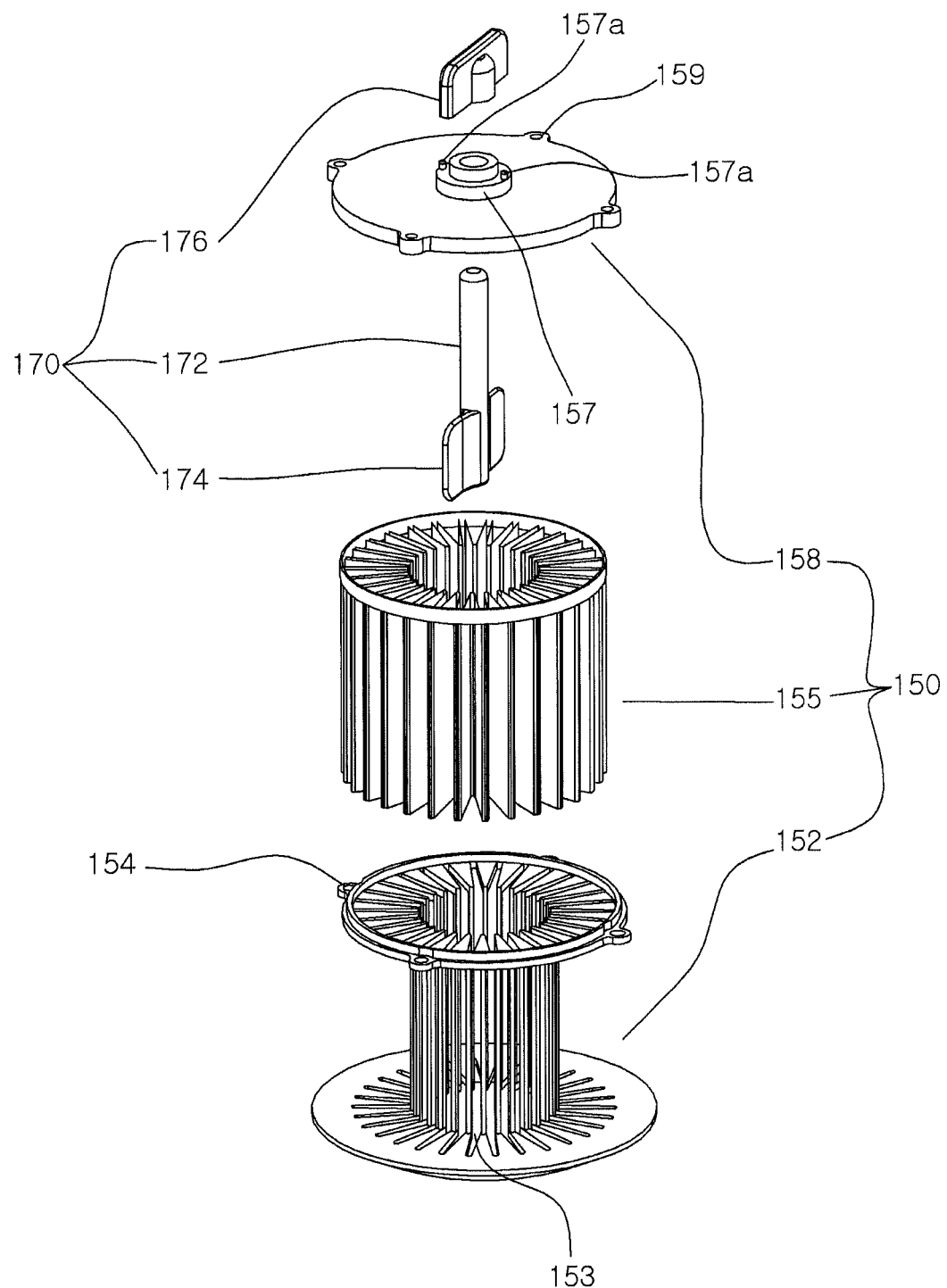
FIG. 6 is an exploded perspective view illustrating a filter assembly and a dust-removing unit of FIG. 2.

Referring to FIGS. 3 and 6, the filter assembly 150 includes a filter frame 152, a filter member 155 and filter fixing cover 158.

The filter frame 152 is formed with a plurality of slits 153 into which the filter member 155 is inserted. The filter frame 152 is arranged between the second cover portion 165 and the second discharge pipe 138, a lower side of the filter frame 152 is supported at the upper side of the inclined portion 138a of the second cyclone discharge pipe 138. That is, the filter frame 152 is arranged at the upper portion of the second cyclone discharge pipe 138.

The filter member 155 is formed with a wrinkled filer having a cylindrical shape. The filter member 155 is supported by inserting into the slits 153 of the filter frame 152.

The filter fixing cover 158 is formed with a circular plate of which a central portion is perforated in a diameter, and is formed at the center of upper surface thereof with a stepped circular plate shaped protruded portion 157. The protruded portion 157 is provided with a pair of insertion protrusions 157a. The protruded portion 157 is inserted into the first insertion hole 167 of the second cover portion 165 and the pair of insertion protrusions 157a is inserted into the second insertion holes 169 (see FIG. 4). The filter fixing cover 158 is coupled to the upper surface of the filter frame 152. At this time, in this exemplary embodiment, after coincidentally arranging cover connection holes 159 formed at an external circumferential surface of the filter fixing cover 158 and the frame connection holes 154 formed at the upper portion of the filter frame 152, they may be screw-coupled using screws (not illustrated). However, as long as the filter-fixing cover 158 is coupled to the filter frame 152, it is possible to use various methods such as using a bonding agent.

Referring to FIGS. 3 and 6, the dust-removing unit 170 is to separate the dust accumulated in the filter member 155 by applying impact to the filter member 155 and includes a rotational support portion 172, a dust removing plate 174 and an operating lever 176.

The rotational support portion 172 is formed in a rod shape, and is inserted into the center of the filter fixing cover 158 in a rotating manner. The dust-removing plate 174 is formed in a square plate shape and is integrally formed with the lower portion of the rotational support portion 172. The operating lever 176 is coupled to the upper portion of the rotational support portion 172. When the user holds and rotates the operating lever 176, the impact is applied to filter member 155 due to rotation of the dust removing plate 174, thereby separating the dust accumulated in the filter member 155.

Referring to FIG. 3, the first cyclone unit S1 according to an exemplary embodiment is arranged to surround the second cyclone unit S2 and the filter assembly 150, and a central axis of the second cyclone discharge pipe 138, a central axis of the filter assembly 150 and a central axis of the second centrifugal separation chamber C3 formed by the centrifugal separation pipe 133 are concentric with an X-X axis of FIG. 3.

The second centrifugal separation chamber C3 formed in the centrifugal separation pipe 133 is arranged below the filter assembly 150 and the second cyclone discharge pipe 138 is formed there between. Accordingly, the dust separated from the filter assembly 150 by the dust-removing unit 170 falls free into the second centrifugal chamber C3 through the second cyclone discharge pipe 138.

Hereinafter, operations of the dust collecting apparatus 100 having the dust-removing unit according to an exemplary embodiment of the present disclosure will be described with reference to the drawings.

Referring to FIG. 3, air introduced into the first centrifugal separation chamber C2 through the introducing opening 111a is whirled and dust included in the introduced air is primarily separated by a centrifugal force and is dropped onto the first dust collecting chamber C1. In this case, the dust dropped onto the first dust collecting chamber C1 is prevented from being influenced by the whirling current occurring from the first centrifugal separation chamber C2 by the anti-scattering ribs 125 formed in the internal case 120, thereby it is not re-scattered.

Subsequently, the air passes through the plurality of through holes 121 to separate dust included therein. The air passed through the plurality of through holes 121 is downwardly moved in the space between the internal case 120 and the second cyclone case 130.

The downwardly moved air is introduced into the second centrifugal separation chamber C3 in the tangential direction through the passages F1 formed by the four guiding members 135 to form the whirling current (see FIG. 4).

After the dust is bumped against the skirt 139 over the top end of the centrifugal separation pipe 133 by the centrifugal force while air formed with whirling current is upwardly whirled, the dust is dripped into the second dust collecting chamber C4, and the purified air is discharged through the discharge opening 138ba and is moved into the filter member 155 through the second cyclone discharge pipe 138.

The air flowing into the filter member 155 outwardly flows from the inside of the filter member 155 such that fine dust is filtered, and moves upwardly in the space between the filter receiving portion 163 and the filter member 155.

Subsequently, the purified air is moved into the space between the filter assembly 150 and the second cover portion 165, is passed through the air discharge holes 168 (see FIG. 5) formed in the second cover portion 165, and then is discharged to the outside through the air discharge pipe 180.

Meanwhile, when the user performs the operation of removing dust so as to separate the dust accumulated in the filter member 155, driving of the vacuum cleaner is stopped to prevent a suction force of the dust collecting apparatus 100 from being transferred.

Under a state in which the suction force is not transferred, if the user holds and rotates the operating lever 176, due to rotation of the dust removing plate 174, the impact is applied to the filter member 155, thereby separating the accumulated dust from the filter member 155.

The separated dust flows backward through the second cyclone discharge pipe 138 and drops into the centrifugal separation chamber C3. In this case, although there is a case in which the dust flows backward without making contact with the second cyclone discharge pipe 138, the dust that is dropped onto the inclined portion 138a slips along the inclined portion 138a and then flows backward through the cylindrical portion 138b of the second cyclone discharge pipe 138.

When the user drives the vacuum cleaner again after finishing the operation of removing dust, the dust dropped into the second centrifugal separation chamber C3 is centrifugally separated by the operation of removing dust and is received in the dust collecting chamber C4.

Like this, when the user cleans up the dust accumulated in the filter member 155, it is possible to clean up the dust accumulated in the filter member 155 by only rotating the operating lever 176 without separating the filter assembly 150 from the dust collecting apparatus 100.

Since the dust separated from the filter member 155 is received in the dust collecting chamber C4, it is not necessary to install a special dust receiving chamber, thereby compacting the volume of the dust collecting apparatus.

In addition, since the dust separated from the filter member 155 flows backward into the second cyclone unit S2 through second cyclone discharge pipe 138, it is not necessary to install a special dust movement passage, thereby simplifying the structure of the dust collecting apparatus. That is, the second cyclone discharge pipe 138 simultaneously performs a passage function that allows the purified air through the second cyclone unit S2 to be discharged there through in case of driving the vacuum cleaner, and a dust movement passage function that allows the dust separated from the filter member 155 to flow backward there through and move to the second cyclone unit S2 in case of performing the operation of removing dust. Accordingly, it is not necessary to install the special movement dust passage compared to the conventional art.

Figure 7:
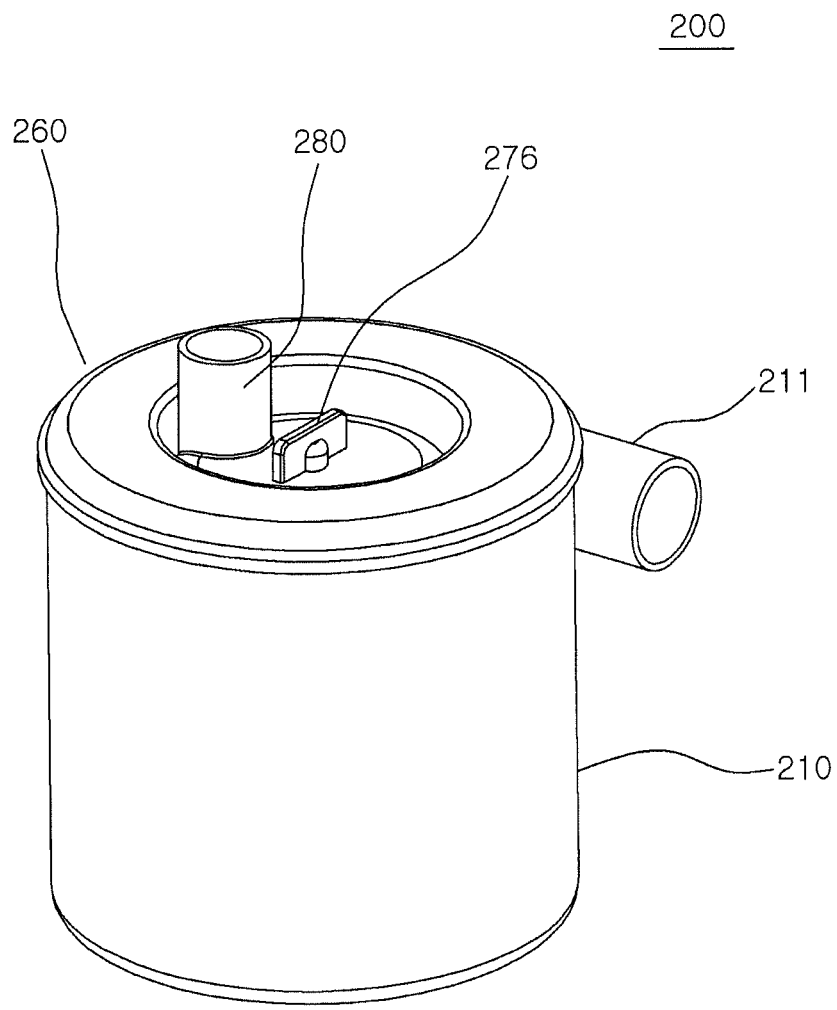
FIG. 7 is a perspective view illustrating a dust collecting apparatus, according to another exemplary embodiment of the present disclosure.
Figure 8:
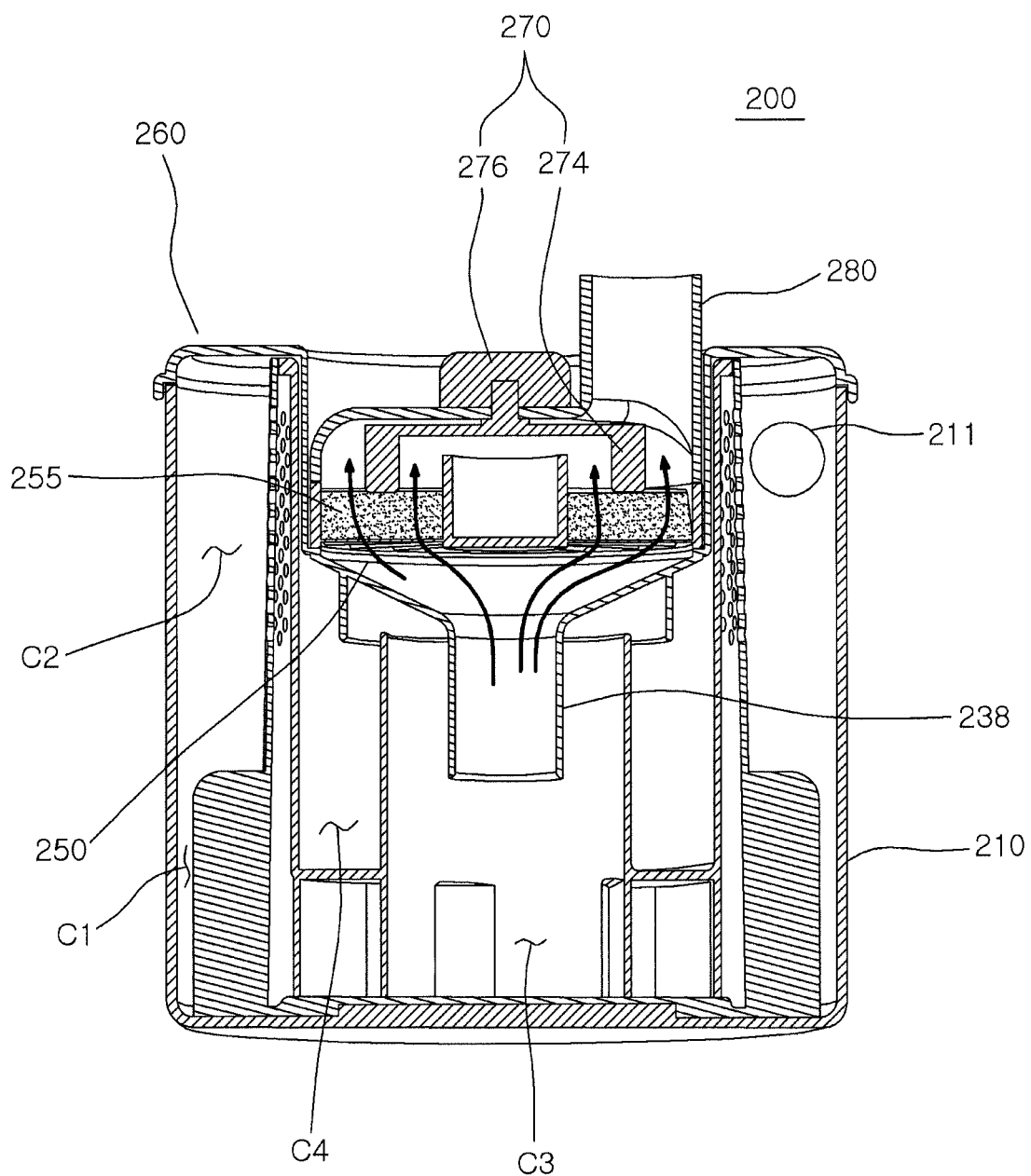
FIG. 8 is a cross-sectional view illustrating a dust collecting apparatus, according to another exemplary embodiment of the present disclosure.

FIG. 7 is a perspective view illustrating a dust collecting apparatus 200 having a dust-removing unit according to another exemplary embodiment of the present disclosure. FIG. 8 is a cross-sectional view illustrating a dust collecting apparatus 200 having a dust-removing unit, according to another exemplary embodiment of the present disclosure. This exemplary embodiment of the present disclosure will be described with reference to FIGS. 7 and 8. To avoid repeated descriptions, descriptions on the same configurations with the dust collecting apparatus, according to the exemplary embodiment discussed above will be omitted.

The dust collecting apparatus 200 according to the second exemplary embodiment of the present disclosure is provided with filter assembly 250 of a circular plate shape, which has a filter member 255 and is horizontally arranged at an upper portion of a second cyclone discharge pipe 238.

A dust-removing unit 270 is installed to apply impact against an upper surface of the filter assembly 250. The dust-removing unit 270 includes a dust-removing plate 274 for separating the dust accumulated on the lower surface of the filter member 255, which branches off from the center thereof toward the both sides so as to make contact with two points on the upper surface of the filter member 255, and an operating lever 276 is installed above the dust-removing plate 274. Unlike the operating lever 176 (see FIG. 3) according to the previous exemplary embodiment, the operating lever 276 is not arranged in the air discharge pipe 280 but is provided to upwardly protrude from the center of the cover member 260. In addition, the air discharge pipe 280 may be installed at an eccentric location from the central portion of the cover member 260. Due to this, in this exemplary embodiment, it is possible to perform the operation of removing the dust by rotating the operating member 276 which is exposed to the outside without separating the air discharge pipe 280.

Hereinafter, with reference to FIGS. 7 and 8, operations of the dust collecting apparatus 200 having the dust-removing unit, according to this exemplary embodiment of the disclosure will be described.

After the dust contained in the air introduced in the first cyclone case 210 through the introducing pipe 111 is centrifugally separated through the first centrifugal separation chamber C2, the separated dust is received in the first dust-collecting chamber C1. The primarily purified air is moved into the second centrifugal separation chamber C3 and is centrifugally separated to allow the separated dust to be received in the second dust-collecting chamber C4. The secondarily purified air is discharged through the second cyclone discharge pipe 238, is re-filtered by the filter member 255 and is discharged to the outside through the air discharge pipe 280. In this case, the air is filtered, upwardly moving from the portion below the filter member 255. Accordingly, the fine dust is accumulated on the lower surface of the filter member 255.

When performing the operation of the removing dust, if the user rotates the operating lever 276, impact is applied to the upper portion of the filter member 255 due to rotation of the dust removing plate 274, the dust accumulated on the lower surface of the filter member 255 is separated and flows backward through the second cyclone discharge pipe 238, and dropped into the second centrifugal separation chamber C3.

Like this, arrangement of the filter member 255 of the dust collecting apparatus 200, according to this exemplary embodiment is different from the previous exemplary embodiment. That is, there is a great difference in that the filter member 255 of the circular plate shape is horizontally arranged at the upper portion of the second cyclone discharge pipe 238. According to this, it is possible that the dust accumulated in the filter member 255 effectively drops into the second centrifugal separation chamber C3 through the second cyclone discharge pipe 238.

Figure 9:
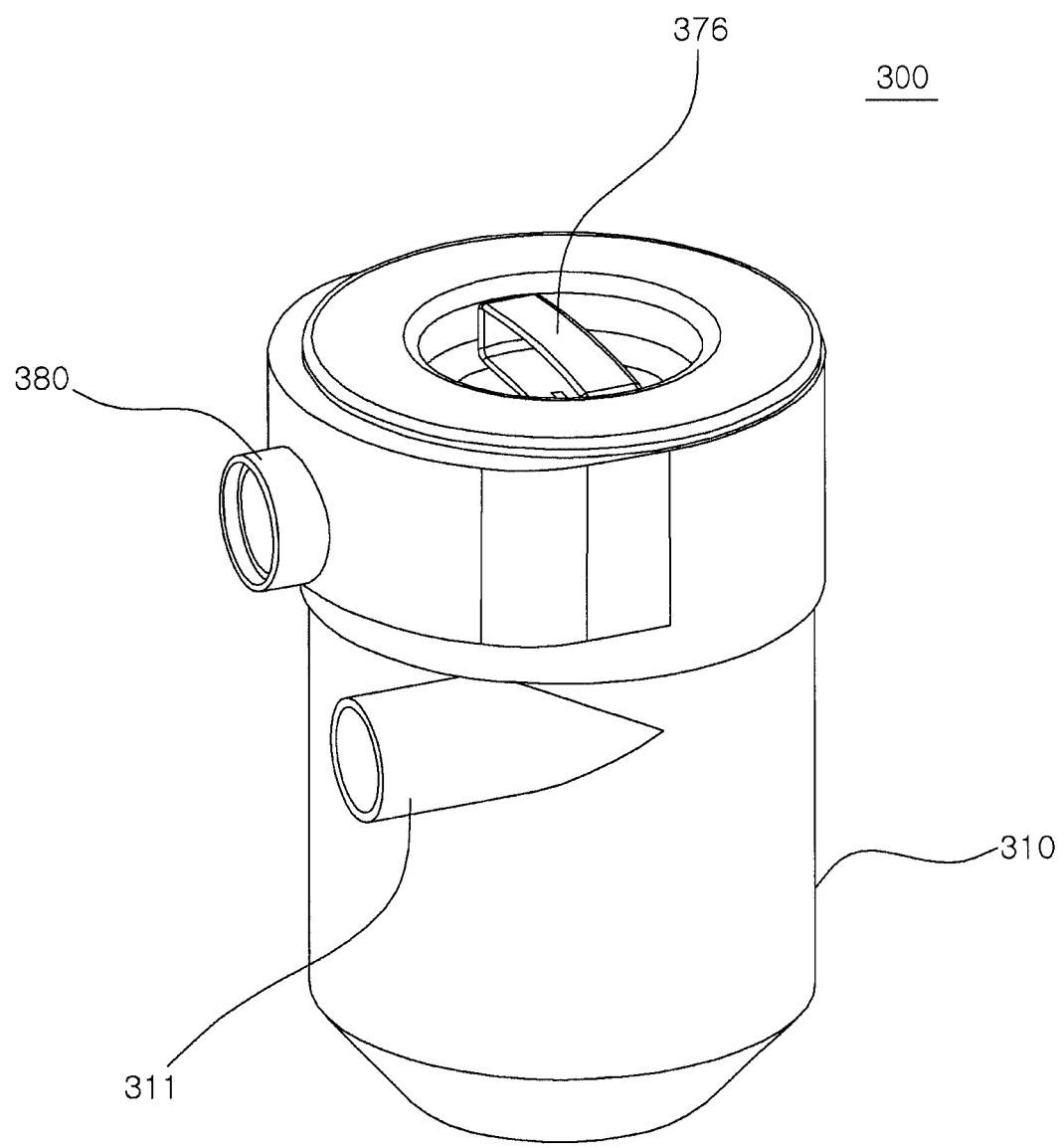
FIG. 9 is a perspective view illustrating a dust collecting apparatus, according to another exemplary embodiment of the present disclosure.
Figure 10:
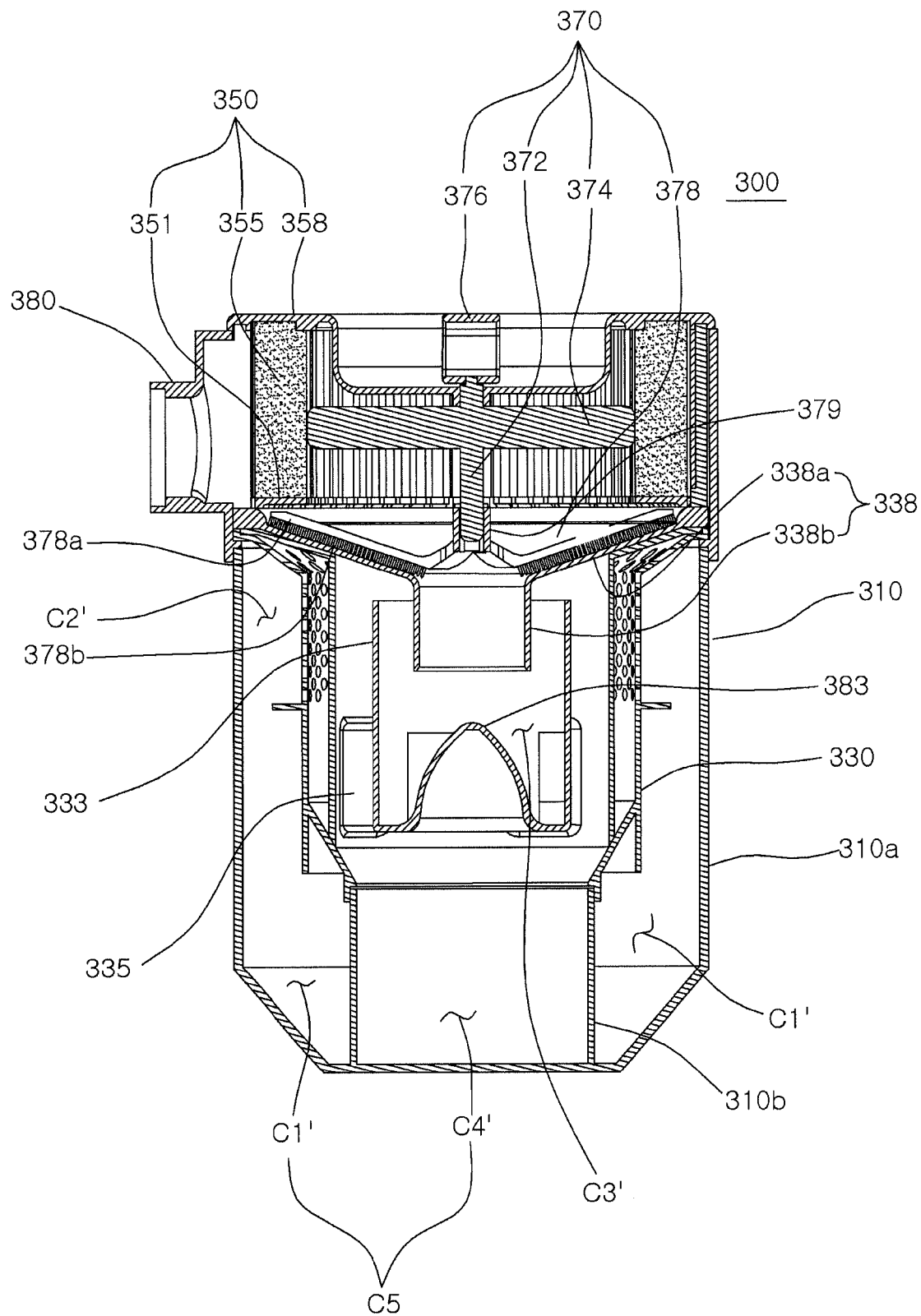
FIG. 10 is a cross-sectional view illustrating a dust collecting apparatus, according to another exemplary embodiment of the present disclosure.

FIGS. 9 and 10 are views illustrating yet another exemplary of the present disclosure. Operations of the dust collecting apparatus 300 having the dust-removing unit, according to this exemplary embodiment will be described with reference to FIGS. 9 and 10. Descriptions on the same configurations as the dust collecting apparatus, according to the previous exemplary embodiments will be omitted.

In this exemplary embodiment, a rising inducement member 383 is formed in a convex manner from an internal lower surface of the centrifugal separation pipe 333. The air, which is formed with whirling current by being introduced into the centrifugal separation pipe 333 through the guiding members 335, is upwardly induced by the rising inducement member 383. In this exemplary embodiment, compared to the first exemplary embodiment, since the rising inducement member 383 is formed, the air introduced into the centrifugal separation pipe 333, that is, second centrifugal separation chamber C3', forms the rising whirling current more effectively, thereby improving the separation of dust from the second centrifugal separation chamber C3'.

In this exemplary embodiment, a dust collecting extension chamber C5 is formed to extend in a downward direction of the first cyclone unit S1 and the second cyclone unit S2.

Compared to the dust collecting apparatus 100 of the first exemplary embodiment, the dust collecting extension chamber C5 is formed in such a manner that the first cyclone case 310 is downwardly lengthened at a first extension portion 310a, and is upwardly extended from the lower surface of the first cyclone case 310 at a second extension portion 310b to be coupled to the lower end of the internal case 330.

By this, capacity of collecting dust of the dust collecting apparatus 300 according to this exemplary embodiment is increased than that of the first and second exemplary embodiment.

In addition, according to this exemplary embodiment, it is possible to have a structure in which the dust dropped on the inclined portion 338a from the filter assembly 350 by operation of removing dust is easily induced to the cylindrical portion 338b. Hereinafter, it will be described in more detail.

Further, in this exemplary embodiment, diameters of the filter assembly 350, the first cyclone case 310 of the first cyclone unit and the second cyclone discharge pipe 338 may be substantially the same. The filter assembly 350 may be arranged to cover the opened lower portion of the first cyclone case 310, and the second cyclone discharge pipe 338 is arranged to cover the lower portion of the filter assembly 350. The inclined portion 338a of the second cyclone discharge pipe 338 has a gentle inclined degree than the inclined portion 138a (see FIG. 3).

The filter assembly 350 includes a filter frame 351, a filter member 355 and filter fixing cover 358.

The filter frame 351 is installed to cover the first cyclone case 310 of the first cyclone unit.

The filter member 355 is configured of a wrinkled filter, is formed in the same cylindrical shape as the filter member 155 (see FIG. 3) of the previous exemplary embodiment and has a larger diameter than that of the filter member 155 of the previous exemplary embodiment.

The filter fixing cover 358 is coupled to the upper portion of the filter frame 351 to fix the filter member 355 inserted into the filter frame 351.

The dust-removing unit 370 includes a rotational support portion 372, a dust removing plate 374, an operating lever 376 and a brush portion 378.

The rotational support portion 372 is formed in a rod shape, and is installed to the center of the filter fixing cover 358 in a rotating manner.

The dust removing plate 374 is extended towards both sides from an outer surface of the rotational support portion 372 so as to make contact with the filter member 355.

The operating lever 376 is coupled to the top end of the rotational support portion 372.

The brush portion 378 includes a brush body 378a and brush member 378b.

The brush body 378a are provided with a connection potion 379 into which the lower end of the rotational support portion 372 is inserted, the brush body 378a is formed in a bar shape which is extended from the connection portion 379 toward both sides to be spaced from the inclined portion 338a of the second cyclone discharge pipe 338 at a distance. In this exemplary embodiment, although it is described that the brush body 378a is configured in one pair, it is possible to configure in one or three.

The brush member 378b is installed on the lower surface of the brush body 378a and one end of the brush member 378b makes contact with the upper surface of the inclined portion 338a of the second cyclone discharge pipe 338.

By these configurations, when the user rotates the operating lever 376, the dust accumulated in the filter member 355 is separated by rotating the dust removing plate 374, a portion of the separated dust flows backward through the cylindrical portion 338b of the second cyclone discharge pipe 338, instantly drops into the second centrifugal separation chamber C3' and the remainder drops onto the inclined portion 338a of the second cyclone discharge pipe 338 and then slips towards the cylindrical portion 338b and flows backward into the cylindrical portion 338b and drops onto the second centrifugal separation chamber C3'.

When the dust removing plate 372 is rotated along with the brush portion 378 by a user's rotating the operating lever 376, the brush member 378b brushes away dust dropped onto the inclined portion 338a of the second cyclone discharge pipe 338 to induce to the cylindrical portion 338b of the second cyclone discharge pipe 338.

In the third exemplary embodiment, when the user rotates the operating lever 376, not only is a role that the dust accumulated in the filter member 355 separated, but also a role that the dust dropped onto the inclined portion 338a of the second cyclone discharge pipe 338 is induced to the cylindrical portion 338b and may be performed simultaneously.

The air discharge pipe 380 according to this exemplary embodiment is installed in a side of the filter assembly 350 so as to have a structure in which the purified air through the filter assembly 350 is discharged in a side direction of the filer assembly 350, the operating lever 376 is installed to expose to the outside like the operating lever 276 (see FIG. 8) of the second exemplary embodiment. According to this, the user may perform the operation of removing dust by rotating the operating lever 376.

Hereinafter, operations of the dust collecting apparatus 300 according to this exemplary embodiment will be described with reference to FIGS. 9 and 10.

The dust contained in the air introduced in the first cyclone case 310 through the introducing pipe 311 is centrifugally separated through the first centrifugal separation chamber C2', the separated dust is received in the first dust collecting chamber C1'. The primarily purified air forms a whirling current in the centrifugal separation pipe 333, that is, in the second centrifugal separation chamber C3', dust is discharged to the dust collecting extension chamber C4', and further inducing the rising by the rising inducement member 383. The secondarily purified air is passed through the second cyclone discharge pipe 338 and then is re-filtered by the filter member 355 and is discharged to the outside through the air discharge pipe 380 along the side surface direction.

Meanwhile, when performing the operation of the removing dust, if the user rotates the operating lever 376, the impact is applied to the filter member 355 due to rotation of the dust removing plate 274, the dust accumulated in the filter member 355 is separated, and the separated dust flows backward into the second cyclone discharge pipe 388 and drops onto the second centrifugal separation chamber C3'. At this time, since the dust removing plate 374 is rotated along with the brush portion 378 simultaneously, the dust dropped onto the inclined portion 338a of the second cyclone discharge pipe 338 is brushed away by the brush member 378b to induce to the cylindrical portion 338b, thereby it is possible that the dust separated from the filter member 355 easily flows backward through the second cyclone discharge pipe 338.

The forgoing description concerns an exemplary embodiment, and is intended to be illustrative. Many alternatives, modifications, and variations within the scope and spirit of the disclosure will be apparent to those skilled in the art.

The present disclosure may be applied to apparatus for collecting dust or refuse such cleaners for home, industrial, or commercial use.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A dust collecting apparatus, comprising:
    a first cyclone unit that rotates air introduced from an outside to separate dust contained in the air;
    a second cyclone unit that secondarily separates fine dust, including a second centrifugal separation chamber into which air discharged from the first cyclone unit is introduced, and a second cyclone discharge pipe through which air discharged from the second centrifugal separation chamber passes;
    a filter assembly disposed in an upper portion of the second cyclone unit, and including a filter member that separates the fine dust from the air discharged from the second cyclone unit; and
    a dust-removing unit to separate dust accumulated in the filter member.

2. The apparatus of claim 1, wherein the first cyclone unit is installed to surround the second cyclone unit and the filter assembly.

3. The apparatus of claim 1, wherein the first cyclone unit includes a first cyclone case of which an upper portion is opened and formed at an upper side thereof with an introducing pipe to introduce the air from the outside; and
    an internal case installed in the first cyclone case and having a plurality of through holes.

4. The apparatus of claim 3, wherein the internal case has at least one re-scattering rib extending from an external circumferential surface thereof.

5. The apparatus of claim 3, wherein the second cyclone unit includes:
    a second cyclone case installed in the internal case;
    a centrifugal separation pipe installed at a center in the second cyclone case to form the second centrifugal separation chamber; and
    a guiding member to communicate an outside of the second cyclone case with an inside of the centrifugal separation pipe and to introduce air introduced between the internal case and the second cyclone case into the centrifugal separation pipe to form a whirling current.

6. The apparatus of claim 5, wherein the plurality of through holes is formed at an upper portion of the internal case;
    wherein the guide member is formed at a lower portion of the second cyclone case and the centrifugal separation pipe.

7. The apparatus of claim 1, wherein the second cyclone discharge pipe is formed in a funnel shape.

8. The apparatus of claim 1, wherein the second cyclone discharge pipe includes;
    an inclined portion formed in a wide upper end and a narrow lower end shape; and configured to support the filter assembly; and
    a cylindrical portion coupled to the inclined portion, wherein at least a portion of dust separated from the filter assembly by the dust-removing unit drops onto the inclined portion and then slips along the inclined portion to drop into the second centrifugal separation chamber through the cylindrical portion.

9. The apparatus of claim 8, wherein the second cyclone unit further includes a skirt downwardly extended from the inclined portion.

10. The apparatus of claim 1, wherein the filter assembly includes:
   a filter frame formed with a plurality of slits;
   a filter member inserted into the plurality of slits; and
   a filter fixing cover coupled to an upper surface of the filter frame;
   wherein the dust-removing unit includes:
   a rotational support portion, which passes through the filter fixing cover in a rotating manner;
   a dust-removing plate formed at a side of the rotational support portion to apply impact to the filter member; and
   an operating lever formed at another side of the rotational support portion.

11. The apparatus of claim 10, wherein the filter member has a cylindrical shape such that air including fine dust is filtered, outwardly flowing from an inside of the filter member.

12. The apparatus of claim 11, wherein the filter member has a circular plate shape such that air including fine dust is filtered, upwardly flowing from a portion below of the filter member.

13. The apparatus of claim 1, further comprising a cover member to cover the first cyclone unit and the second cyclone unit.

14. The apparatus of claim 1, further comprising a rising inducement member provided in the second cyclone unit such that the whirling current formed by introducing to the second cyclone unit moves up.

15. The apparatus of claim 1, further comprising a dust collecting extension member extending towards a lower sides of the first and second cyclone units.

16. The apparatus of claim 1, wherein the dust-removing unit includes:
   a rotational support portion installed to the filter assembly in a rotating manner;
   a dust-removing plate formed at the rotational support portion to apply impact to the filter assembly;
   an operating lever installed at a top end of the rotational support portion; and
   a brush portion installed at the rotational support portion to brush away dust dropped on an inclined upper surface of the second cyclone discharge pipe.

17. The apparatus of claim 16, wherein the brush portion includes:
   at least one brush body; and
   a brush member provided in the brush body to come in contact with the second cyclone discharge pipe.

18. The apparatus of claim 1, wherein the dust separated from the filter member is collected into the second centrifugal separation chamber through the second cyclone discharge pipe.

19. A dust collecting apparatus, comprising:
   a first cyclone unit that rotates air introduced from an outside;
   a first centrifugal separation chamber to separate dust contained in the introduced air;
   a second centrifugal separation chamber to secondarily separate dust from the introduced air, and a second cyclone discharge chamber to discharge the introduced air;
   a filter assembly of a circular plate shape, including a filter member that is horizontally arranged at an upper portion of the second cyclone discharge pipe to re-filter the introduced air discharged from the second cyclone discharge chamber.

20. The dust collecting apparatus of claim 19, further comprising a dust-removing unit to separate dust accumulated in the filter member including a dust-removing plate formed at the rotational support portion to apply impact to the filter assembly.

* * * * *